Oct. 9, 1951 J. R. DE BAUN 2,570,775

ELECTRICAL TIMING COMPARATOR CIRCUIT

Filed Dec. 30, 1948 6 Sheets-Sheet 1

INVENTOR
James R. DeBaun
BY [signature]
ATTORNEY

ELECTRICAL TIMING COMPARATOR CIRCUIT

INVENTOR
James R. De Baun
BY
[signature]
ATTORNEY

INVENTOR
James R. De Baun
BY
[signature]
ATTORNEY

Oct. 9, 1951 J. R. DE BAUN 2,570,775

ELECTRICAL TIMING COMPARATOR CIRCUIT

Filed Dec. 30, 1948 6 Sheets-Sheet 4

INVENTOR
James R. DeBaun
BY
[signature] Mitchell
ATTORNEY

Oct. 9, 1951 J. R. DE BAUN 2,570,775

ELECTRICAL TIMING COMPARATOR CIRCUIT

Filed Dec. 30, 1948 6 Sheets-Sheet 5

INVENTOR
James R. De Baun
BY
[signature]
ATTORNEY

Oct. 9, 1951 J. R. DE BAUN 2,570,775

ELECTRICAL TIMING COMPARATOR CIRCUIT

Filed Dec. 30, 1948 6 Sheets-Sheet 6

INVENTOR
James R. DeBaun
BY
[signature]
ATTORNEY

Patented Oct. 9, 1951 2,570,775

UNITED STATES PATENT OFFICE 2,570,775

ELECTRICAL TIMING COMPARATOR CIRCUIT

James R. De Baun, Greenvale, N. Y., assignor to Radio Corporation of America, a corporation of Delaware Application December 30, 1948, Serial No. 68,236

13 Claims. (Cl. 178—69.5)

This present invention relates to synchronizing and phasing electrical circuits and in particular, although not necessarily limited thereto, to a method and apparatus for synchronizing and phasing television equipment.

More particularly, the present invention deals with a synchronizing lock-in arrangement for a television transmission system in which it is desirable to interchangeably transmit either a remotely generated television signal or a locally generated television signal in such a manner as to eliminate discontinuity in the series of signal transmission during the transition from remote to local signal source.

In television practice, television transmitting stations transmit a composite television signal which mainly comprises a video component, a synchronizing component and a blanking component. Generally, the synchronizing and blanking component are generated by a sync signal generating system preferably located at a position near the point of image pick up. The synchronizing and blanking information is supplied to the image pick up equipment for synchronization of its scanning action in the production of the video signal. The synchronizing and blanking information is then mixed with the resulting image video signal to produce the composite signal for modulation of the television radio transmitter.

The sync signal generator for generating the synchronizing and blanking information is usually controlled by a master oscillator operating at a multiple of the image line frequency. In order to avoid drift in the operating frequency of the master oscillator and consequent irregularities in the reproduced television image, the master oscillator is commonly linked to some standard frequency source which, for example, may be the 60 cycle of the local public utilities power distribution system. A very convenient way of accomplishing this linkage is by means of comparing the field frequency rate of the field synchronizing pulse developed by the sync signal generator with the frequency of the local power line and correcting the frequency of the master oscillator in accordance with the degree of difference detected by the frequency comparison. Under proper operating conditions this ensures that the transmitted synchronizing signals are always in synchronism with the 60 cycle supply main. Such apparatus is well-known in the art and one form widely used is described in detail in a paper by Smith and Bedford which appeared in the RCA Review for July 1940, vol. 5, #1, pages 51–68, "A Precision Television Synchronizing Signal Generator."

Such a system is usually provided where only one sync signal transmitting chain is used or where program material originates only from scanning equipment operated by the local synchronizing signal generator. When, however, it is desired to transmit or retransmit program material originating from a remote location, it becomes desirable to supply some means for locking in the local sync generator with the remotely generated television signal. This lock-in feature is generally necessary because the remote pick up equipment may be operated on an entirely different public utilities power supply system and hence being controlled in frequency and phase by a slightly different power line frequency from that of the main studios. If no lock-in feature were provided, switching from locally generated program material to remotely generated program material would result in a disturbance in the reproduced television image at television receiving locations due to discontinuity in synchronizing information applied to the television receiver beam deflection system.

Moreover, in the transmission of special effects such as "lap dissolve," video "wipes," or composite pictures by the superimposition of the remote and locally generated television signal, it is necessary to maintain precise synchronism and accurate phasing between the two signals undergoing the special effects process. For example, it is well known that failure to maintain proper lock-in between two superimposed television signals will create the effect of one picture drifting past the other. Correspondingly, improper synchronization in the case of the lap dissolve would produce a disagreeable displacement between the pictures being dissolved.

A number of systems have been provided in the art for accomplishing the necessary synchronization of the local sync generator with the remote television signal. In the majority of the television lock-in or synchronizing arrangements presently known, the incoming signal is visually compared with the locally generated signal by oscillographic examination of the respective remote and locally generated composite television signal synchronizing components. The local sync signal generator is then divorced from its control by the public utilities power main supply frequency and manually adjusted in operating frequency and phase until proper coincidence between the remote and local synchronizing components is realized. In the instance of coincidence, the local sync generator is then supplied with remotely generated sync signal separated from the remote composite television signal and is thereafter electrically and directly held in synchronism with the remote signal. Such an arrangement requires the presence of trained operating personnel to properly accomplish the lock-in operation.

In interlaced television systems with which the present invention is more directly concerned, the phasing between the remote and local signals just prior to lock-in poses a problem of even greater importance and requires additional caution on the part of the operator manually accomplishing the matching of signals. The additional phasing problem presented arises by merit of the fact that an interlaced television signal comprises alternate even and odd field representations. Each field is displaced from the other by one half a line vertical displacement in the reproduced image raster and consequently, in an interlaced television signal, successive groups of line sync pulses embraced by the field blanking interval are not symmetrical. Thus, it appears that the mere superimposition of the filed sync pulse of the remote television signal with a field sync pulse of the local television signal would not necessarily indicate a proper phasing relationship and "lock-in" of the systems, and such conditions may cause an improper field interlaced condition to exist when mixing the signals for special effects purposes.

It will thus be clear that it is necessary that the remote and local field sync signals not only coincide in timing phase but must also bear a coincident relationship with respect to the even or odd interlaced field scansions which they represent. Such considerations and a system for manually accomplishing a satisfactory lock-in between two television systems utilizing interlaced scansion is described in full detail in U. S. Patent 2,329,339 entitled "Electrical Circuit" issued September 14, 1943, to James Russell DeBaun.

The present invention overcomes some of the disadvantages found in prior art systems by providing a wholly automatic means for accomplishing a precision lock-in between two unrelated television signals of the interlaced variety. Moreover, the present invention in addition to being wholly automatic and thus eliminating the need for providing a trained operator for relative synchronism of the unrelated signals further provides a lock-in system which has considerably higher speed of operation.

Another aspect of the present invention deals with novel method of differentiating between an even and odd field scansion representations in a television signal which develops an output actuating impulse only upon the encounter of an even or odd field sync pulse, the even or odd designations are purely arbitrary but are well defined over one another. This phase of the present invention will be referred to as the Field Differentiator.

Another phase of the present invention deals with a novel field matching detector circuit which incorporates two of the above field differentiator arrangements in conjunction with a standard frequency comparator circuit such that the occurrence of even fields of the local signal is compared in frequency with the occurrence of even fields of the remote signal to develop an output voltage in accordance with the frequency difference between the two signals. A limited and inadequate amount of phase "lock-in" precision is supplied by this arrangement, which will be referred to hereinafter as the Field Matching Detector.

Another aspect of the present invention deals with a novel detector circuit for detecting exact coincidence of interlace between the local and remote television signals and is productive of an output pulse only upon exact coincidence of local even field scansion signal representations with remote even field scansion signal representations. This arrangement will be referred to hereinafter as the Interlace Coincidence Detector.

One embodiment of the overall interlaced synchronized locking-in system provided by the present invention contemplates the use of both the Field Matching Detector circuit and the Interlace Coincidence Detector both operating to control the timing of the local synchronizing signal generator master oscillator. The Field Matching Detector comprising two Field Differentiator arrangements compares the frequency of local and remote even field recurrence to develop a control potential for a reactance tube associated with the local sync signal generator master oscillator. Thereby, the frequency of the local sync signal generator, when divorced from the 60 cycle power line frequency control, will be very closely controlled in frequency and in phase with the remote television signal. Precision lock-in, however, as will be more fully described hereinafter, is not accomplished by the Field Matching Detector alone. Consequently, the Interlace Coincidence Detector, which is productive of an output pulse only upon exact interlace coincidence of the two television signals is used to control application of the remote sync signal to the local sync signal generator master oscillator such that upon interlaced coincidence of the two signals, control of the master oscillator is automatically assumed by the remote synchronizing signal. Therefore:

It is a major object of the present invention to provide a new and improved method and apparatus for synchronizing electric circuits.

Another object of the present invention is to provide a new and useful method and apparatus for synchronizing the sync generators of a television transmission.

Another object of the present invention is to provide a new and improved synchronizing method and apparatus which permits the selection for transmission of one or more individually generated video signals without producing "drop outs" or tearing of the received image.

Still another object of the present invention is to provide a method and apparatus for synchronizing television signals sync generators in conjunction with special effects apparatus so as to improve the reproduced relationship between image components represented by the two television signals.

A further object of the present invention resides in the provision of a novel Field Differentiator arrangement for use in conjunction with composite television signals of the interlaced variety to differentiate between even and odd field scansion representations comprising the composite interlaced signal.

Another object of the present invention is to provide a novel Field Matching Detector arrangement for use in comparing two television signals of the interlaced variety so as to develop an output voltage in accordance with the timing difference existing between even or odd field scansions of the television signals.

A still further object of the present invention is to provide an Interlace Coincidence Detector for use in conjunction with two television signals of the interlaced variety to produce an actuating impulse only upon precise timed coincidence of even and odd interlaced scansion representations of the two television signals.

Another object of the present invention is to provide a new and improved television control system for controlling a local television signal sync signal generator in accordance with synchronizing information derived from an unrelated remote composite television signal, said television control system being wholly automatic in operation to secure precision interlaced coincidence between the local and remote signal to eliminate discontinuities in signal transmission when alternately switching from the local television signal to the remote television signal.

It is another object of the present invention to provide a novel and improved signal comparator arrangement for electrical signals wherein certain aspects of two unrelated but similar electrical signals are employed to produce separate series of constant width pulses and the timing or phase relationship between the two signals indicated by means of combining the constant width pulses so produced.

The invention possesses numerous other objects and features of advantage some of which together with the foregoing will be set forth in the following description of apparatus embodying and utilizing the invention. It is therefore to be understood that the present invention is applicable to other apparatus and that it is in no way limited to the particular system environment or apparatus shown herein as other advantageous embodiments in accordance with the teachings as set forth in the appended claims will occur to those skilled in the art after having benefited from the instruction of the following description taken in connection with the accompanying drawings in which:

Figures 1A, 1B, 1C, 1D, 1E:
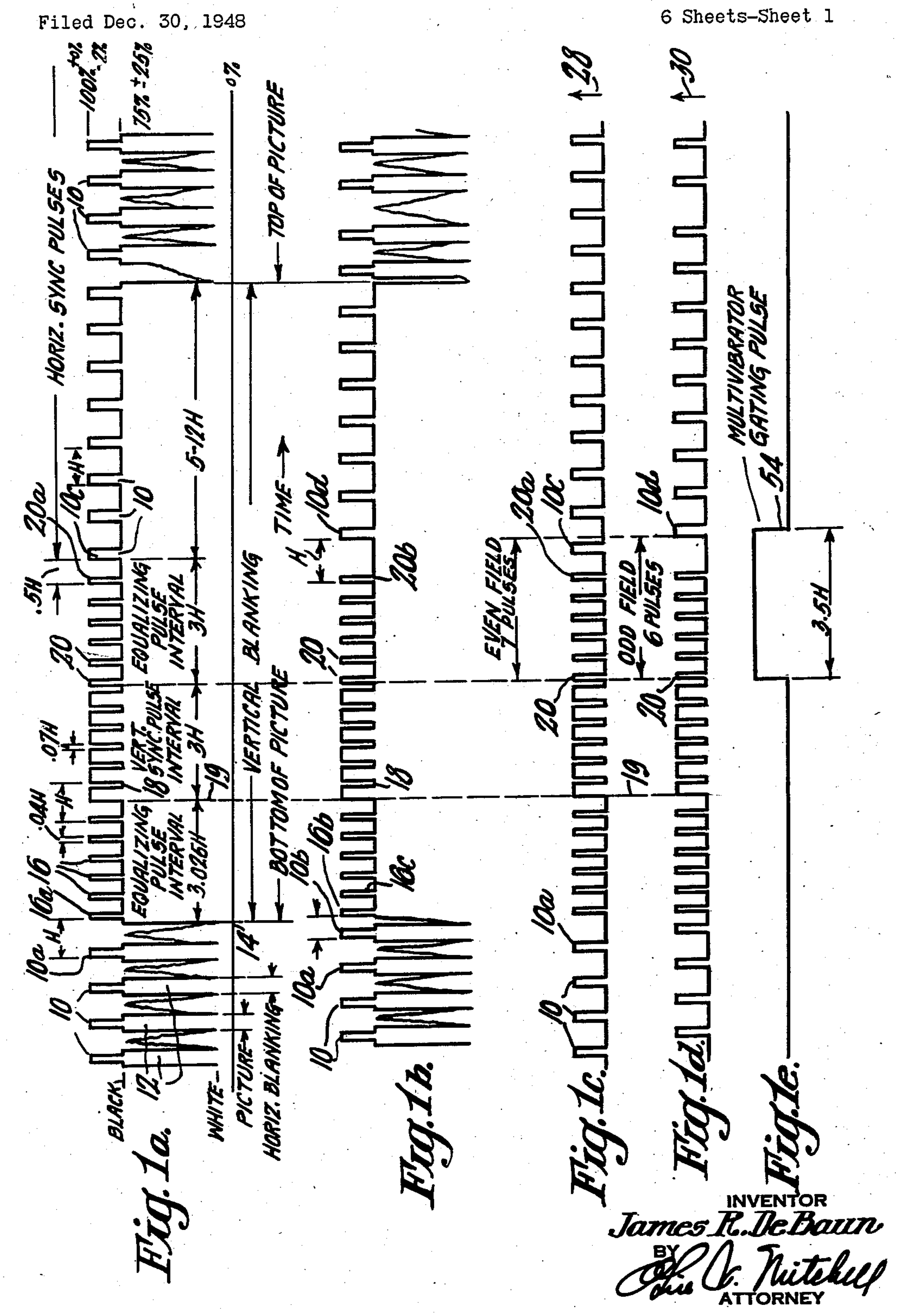
Figure 1 illustrates the form of a standard RMA interlaced television signal shown in timed relationship with synchronizing information derived therefrom and certain waveform characteristics peculiar to one aspect of the present invention.

Referring now to Figure 1, there is shown by curves 1a and 1b, certain characteristics of the present standard RMA television signal employed to transmit and reproduce a 525 line interlaced image comprising two interlaced field scansions. Due to the ease of system "tie-in" with local public utilities' power distribution 60 cycle main frequency, successive fields will be assumed to occur at 60 fields per second to produce 30 complete frames per second, which in turn will require the standard 15,750 C. P. S. image line frequency. Each frame therefore comprises two interlaced scansions of 262½ lines.

In curves 1a and 1b of Figure 1 the composite television signal can be seen to comprise a series of line synchronizing pulses such as 10 which are situated on top of line blanking pulses, such as 12. Following the line synchronizing pulses 10 at a point in the signal corresponding to the bottom of the image or picture (defined by index line 14) there is provided a series of 6 equalizing pulses 16, each separated by an interval equivalent to ½ a horizontal line period (H). The configuration in 1a will be arbitrarily assumed to represent the first portion of an even field scansion representation inasmuch as the last horizontal line synchronizing pulse 10a is separated from the first equalizing pulse 16a by a full horizontal line interval (H). The configuration in 1b, on the other hand, will be arbitrarily considered as representing the beginning of an odd field scansion inasmuch as the last line synchronizing pulse 10b is separated from the first equalizing pulse 16b by only a half-line interval or .5H.

The leading edges of the first equalizing pulses 16a and 16b of both the even and odd frames are shown as being in coincidence and there remains substantially no difference in the configuration of the ensuring equalizing pulse interval and vertical sync pulse intervals. However, examination will show that the even field scansion representation (1a) is provided with a regular horizontal line synchronizing pulse 10c at a time only .5H from the last equalizing pulse 20a while the odd field scansion configuration in 1b is provided with its first horizontal line synchronizing pulse 10d at a time H following its last equalizing pulse 20b.

Therefore, the obvious difference between the even and odd field scansions clearly appears to be twofold. Both appear in the vicinity of the vertical blanking interval. The first difference resides in the timing between the synchronizing pulse corresponding to the last field line and the first equalizing pulse of the respective field scansions. The second difference, which is in reality, the equivalent of the latter first mentioned difference, is the one pertinent to the embodiment of the present invention shown hereinafter, and may be gleaned by observing the timing between the last field equalizing pulse and the first horizontal line sync pulse during the vertical blanking period in the respective even and odd configurations.

From the foregoing, it follows that if two unrelated composite television signals of the type shown in Figure 1 were to be interchangeably transmitted over a given television transmitter without any discontinuity occurring during the switching operation, the two signals would have to be in interlaced coincidence or synchronized on a frame, line and field basis. Accordingly, even scansion configurations (as in 1a) of a remotely generated television signal are not continuously interchangeable and thus capable of "smooth" mixing with the odd field scansion representation (1b) of the locally generated television signals because for smooth mixing the even configuration (1a) of the remote signal must coincide with the even configuration (1a) of the locally generated signal.

To obtain this necessary coincidence between local and remote signal, the present invention contemplates three steps: the first step provides the identification of even fields in both the remote and locally generated signal. This step, as hereinabove briefly described, employs a Field Differentiator arrangement. By using this Field Differentiator information the first step also contemplates partial "lock-in" of the local signal with the incoming remote signal insofar as odd fields vs. odd fields and even fields vs. even fields are concerned. No attempts in this first step are made to identify or "phase" individual lines and hence hunting between signals may therefore exist.

The second step involves the use of the above-referred to Interlaced Coincidence Detector which responds to and identifies the conditions of precision interlace between the two signals and supplements the first step by producing an output only when remote even fields exactly coincide with local even fields on a line basis.

The third and final step involves the application of synchronizing information derived from the incoming signal to the master oscillator controlling the local synchronizing signal generator. This application of synchronizing information is, according to the present invention, controlled by the output developed by the Interlaced Coincidence Detector. This last step provides the final precision lock-in between the remote and locally generated signal.

Figures 2, 3:
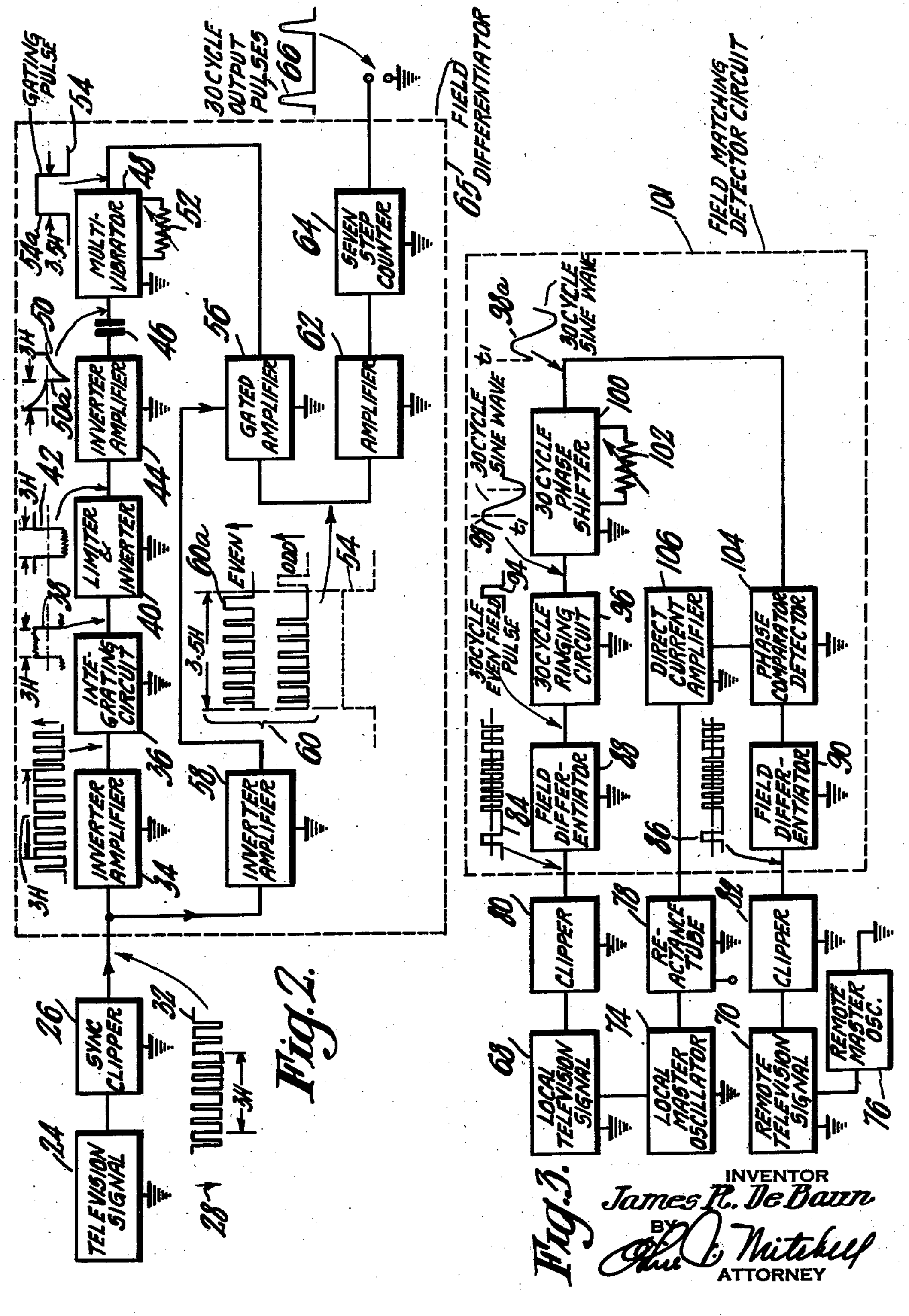
Figure 2 is a diagrammatic representation of one aspect of the present invention.
Figure 3 is a diagrammatic representation of the circuit arrangement used in connection with another aspect of the present invention.

Considering now in more detail the aforementioned three steps and just how the present invention accomplishes the functions therein, reference is now made to Figure 2, where there is shown a method for differentiating between the even and odd field scansion of an interlaced television signal of the type shown in Figure 1. There is shown a source of television signal 24, the waveform of this television signal being illustrated by curves 1*a* and 1*b* of Figure 1. This signal is then applied to a conventional sync clipper circuit 26 which segregates the synchronizing component comprising the horizontal sync pulses, the equalizing sync pulses, and the serrated vertical sync from the composite television signal in Figures 1*a* and 1*b*. The segregated pulses are shown in proper timing relationship to the respective even and odd configuration of the composite signal by curves 1*c* and 1*d*. Indicating arrows 28 and 30 at the right-hand extremity of curves 1*c* and 1*d* in Figure 1 are shown to indicate the direction of top or peak of sync and serves merely as a polarity index in subsequent illustrations of the separated sync signal. For example, the output signal 32 of the sync clipper 26 in Figure 2 has associated therewith the arrow 28 pointing in a downward direction indicating that the sync is negative at the output of the sync clipper 26.

The separated sync 32 is then applied to the inverter amplifier 34 which returns the separated sync to a sync positive polarity. The separated sync is then integrated by integrator circuit 36 to provide a control pulse 38 having substantially the same width (3H) as the vertical synchronizing interval. In practice, the pulse 38 need not be as sharply defined as that illustrated. For sake of descriptive clarity, the integrating circuit has been shown as productive of a very square pulse. The integrated vertical sync 38 is then limited and inverted by the circuit shown at 40 to provide the waveform shown at 42 also having a width substantially equal to 3H. After passing through another inverter amplifier 44, the vertical sync 42 is differentiated through the action of capacitor 46 coupling the inverter amplifier 44 with the multi-vibrator 48, so that the signal is active to synchronize the multi-vibrator 48. This differentiated signal is of a form similar to that shown at 50. The multi-vibrator 48 is of a type adapted to synchronize on a negatively extending pulse and is adjustable by some means such as rheostat 52 to generate an output pulse 54 having a width substantially equal to 3.5H. The leading edge 54*a* of the multi-vibrator pulse 54 will therefore correspond in timing to the trailing edge 50*a* of the differentiated sync pulse 50 applied to the multi-vibrator. The trailing edge of the sync pulse 50*a* can be seen by reference to Figures 1*c* and 1*d* to correspond in timing to the leading edge of the first equalizing pulse following the last serration of the vertical sync pulse interval (Figure 1*a*), or in other words, the end of the vertical sync pulse interval. The multi-vibrator pulse 54, which is later to be used as a gating pulse for an amplifier, is shown in Figure 1*e* in proper timed relationship with respect to the vertical sync pulse interval.

This multi-vibrator pulse 54 is then utilized to control transmission by the gated amplifier 56, the gated amplifier being supplied with separated positive sync through the inverter amplifier 58 connected with the input of inverter amplifier 34. Thus, the output of the gated amplifier 56, as controlled by the gating pulse 54, will appear substantially as shown in the brackets 60. The gating pulse 54 has been shown in dotted lines below the output signal 60 for purposes of clarity. It is therefore evident that since the gated amplifier is conductive to pass signal only during the duration of the gating pulse 54, the output of the gated amplifier will comprise two separate series of signals in respective response to even and odd frame scansion configurations.

Upon the encounter of an even frame configuration, the gated amplifier 56 will supply the series of pulses 60*a*, which when referred to Figure 1*a* or 1*c*, taken in connection with the gating pulse at 1*e*, can be seen to embrace the last six equalizing pulses 20 and the first regular horizontal line sync pulse 10*c* following vertical sync. However, upon the encounter of an odd field scansion configuration, the gating pulse 54*a* being again timed to have its genesis at the end of the vertical sync pulse and having the same width 3.5H, will embrace only the six equalizing pulses following the vertical sync as shown in Figures 1*b* and 1*d*. In this latter case, the first horizontal line sync pulse 10*d* being .5H later than the even horizontal sync pulse 10*c* is not included in the time interval 3.5H defined by the gating pulse 54. Therefore, for even frames the gated amplifier will pass seven pulses whereas for odd frames it will pass only six. Furthermore, since a horizontal sync pulse is approximately twice the width of an equalizing pulse, the amplifier's energy output will be approximately ⅓ greater for an even frame than for an odd frame.

The output of the gated amplifier 56 is then applied to the amplifier 62 whose output is in turn applied to a conventional 7-step counter circuit at 64. The counter circuit 64 may be merely an integrating type of counter, which is responsive to supply an output pulse 66 only upon the application of the seven successive pulses corresponding to an even frame, whereas upon the receipt of only six successive pulses (odd frame) the counter circuit will develop no output signal. Manifestly, the output signal 66 of the seven step counter will then be in timing with the vertical sync pulse intervals of only the even field scansion configurations and consequently will have a 30 cycle recurrence frequency.

Thus, the major portion of step 1 of the system has been accomplished and differentiation between the even and odd field scansion configurations of the television system has been achieved. This arrangement shown in Figure 2 is therefore arbitrarily termed a Field Differentiator.

In a television system of the type with which this invention mainly deals wherein a remotely generated signal and a locally generated signal are to be "locked-in" with one another, two of the Field Differentiator circuits as shown in Figure 2 may be employed in an arrangement shown in Figure 3, to from what will be termed a Field Matching Detector circuit. In Figure 3, there is shown a source of local television signal 68 and a source of remote television signal source 70. Master oscillators 74 and 76, which control the operating frequency of the two generating circuits, are shown associated with the respective television signal sources. Since it is difficult to exercise control over the remote television signal master oscillator due to its location, the synchronizing control will be applied to the local master oscillator 74 by means of a reactance tube 78. To derive the control voltage for the reactance tube 78, the local and remote television composite signals are applied to two respective clipping circuits 80 and 82 which respectively separate local and remote synchronizing signal components from the composite signals. The separated synchronizing components are indicated at 84 and 86 and are shown as being applied to two separate Field Differentiator circuits 88 and 90 of the type shown in the dotted line area 65 of Figure 2. Thus, the output of local Field Differentiator 88 will have a 30 cycle pulse corresponding to the occurrence of even fields in the local television signal while the remote Field Differentiator circuit 90 will have a 30 cycle output pulse corresponding in timing to even fields of the remote television signal. For illustrative simplicity, only the 30 cycle output pulse 94 of the local Field Differentiator 88 has been shown.

The output pulse 94 of the local Field Differentiator 88 is then applied to some form of 30 cycle ringing circuit shown at 96, the output of which comprises a 30 cycle sine wave 98 necessarily in synchronism with 30 cycle pulse 94. This sine wave 98 is then supplied to the 30 cycle phase shifter circuit 100 having a means such as rheostat 102 for varying the phase of the 30 cycle sine wave relative to the local even field pulse 94. To show this phase shift effect, an arbitrary timing index $t1$ has been associated with the sine wave 98 before being shifted and the sine wave 98a subsequent to the action of the phase shifter 100. The sine wave 98a is then delivered to a phase comparator detector 104 of any conventional design. Also delivered to the phase comparator 104 is the 30 cycle output pulse of the remote differentiator 90 so that the unidirectional output voltage of the phase comparator detector 104 will be a function of the difference in timing between even fields of the local television signal and even fields of the remote television signal. The output voltage of the phase comparator may then be amplified by an amplifier such as 106 and supplied to the reactance tube 78 in order to correct the timing of the local master oscillator 74 so that even local fields are held in substantial synchronization with even remote fields. As hereinabove mentioned this second part of step 1 does not provide a complete lock-in between the local and remote signals so that there may exist some hunting between even local and even remote fields resulting in lack of line synchronization. Hence, the arrangement of Figure 3 affords a matching action of even frames with even frames and odd frames with odd frames but does not establish a "tight" or positive "lock-in" relationship between the local and remote signal.

Figure 4:
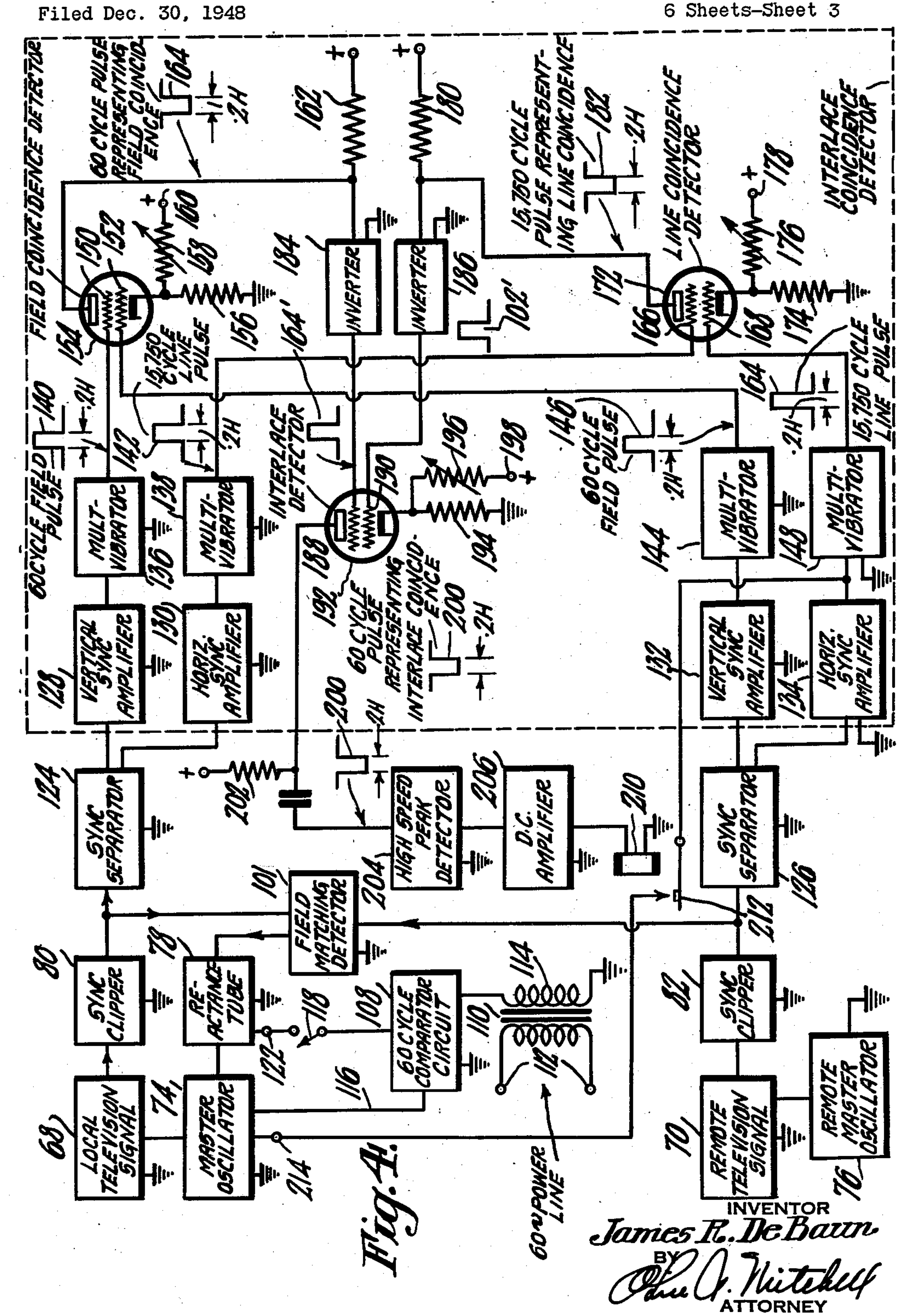
Figure 4 is a diagrammatic representation of the overall synchronizing lock-in system as provided by the present invention.

Having now satisfactorily achieved all of the objects assigned to step 1 of the present system, consideration will now be given to step 2, which establishes the precise lock-in relationship which step 1 may fail to afford, which relationship is eminently necessary for satisfactory interchangeable transmission of the local and remote television signals over a common transmitter. Figure 4 therefore illustrates the overall system which embodies steps 1, 2, and 3 to provide the rigid control needed. Investigation will reveal that the local television signal source 68 and the remote television signal source 70 with the respective master oscillator 74 and 76 as well as sync clipper 80 and 82 provides the same general arrangement shown by the first section of Figure 3 feeding the Field Matching Detector shown in dotted area 101.

In Figure 4, however, a well-known 60 cycle comparator circuit 108 is additionally illustrated. This comparator arrangement as hereinbefore discussed may be of any well-known variety which is adaptable to compare by means of transformer 110 the 60 cycle power line frequency at terminal 112 with the 60 cycle vertical or field sync pulse developed by the master oscillator 74. Thus, in addition to the 60 cycle signal developed across the transformer secondary 114 and applied to the comparator circuit 108, a connection 116 is shown from the master oscillator 74 to supply the necessary vertical synchronizing information. During operation of the local television signal system over periods in which it is not desired to effect synchronization with a remote television signal, the correcting voltage developed by the comparator circuit 108 may be applied through switch 118 to a control terminal 122 on the reactance tube circuit 78. Accordingly, during synchronous control of the local master oscillator by the remote television signal in accordance with the methods of the present invention, the influence of the 60 cycle comparator circuit 108 would be withheld from the reactance tube 78 by maintaining the switch 118 in an open position.

The output of the sync clippers 80 and 82 in Figure 4 as in Figure 3 is supplied to the Field Matching Detector 101 which embraces the circuit components defined by the dotted line area 101 in Figure 3. The output control voltage of the direct current amplifier 106 in Figure 3 is represented in Figure 4 as the output control voltage of the Field Matching Detector 101 and is shown as being applied to the reactance tube 78 in accordance with the arrangement in Figure 3 so that field matching action is achieved.

Considering now step 3, the clipped synchronizing information from the sync clippers 80 and 82 is applied to respective sync separator circuits 124 and 126 which separate the clipped sync of the local and remote television signals into respective vertical and horizontal synchronizing components. These vertical frame and horizontal line synchronizing components are then respectively and separately applied to the vertical and horizontal sync amplifiers 128, 130, 132, and 134. The output of the vertical and horizontal sync amplifiers handling the local signal are respectively applied to control multivibrators 136 and 138. Each of these multivibrators is adapted to produce an output pulse having a width substantially less than one horizontal line interval or in the case shown is assigned an exemplary value of .2H. The multivibrator 136 being synchronized by the vertical sync amplifier 128 will then be productive of a series of .2H width pulses 140 having a recurrence frequency of 60 C. P. S. The multi-vibrator 138 being synchronized by the horizontal sync amplifier 130 will in turn be productive of an output pulse 142 having a recurrence frequency of 15,750 C. P. S. of width .2H. A similar arrangement is provided in connection with the vertical sync amplifiers 132 and 134 handling remote television synchronizing signal. Vertical sync amplifier 132 synchronizes multi-vibrator 144 to produce a 60 C. P. S. output pulse 146 having a constant width of .2H. Horizontal sync amplifier 134 synchronizes multi-vibrator 148 to produce a 15,750 C. P. S. pulse 164 of a constant width of .2H.

The 60 cycle pulses produced by the multivibrators 136 and 144 are necessarily in synchronism with the vertical sync pulses of the respective composite interlaced signals and, consequently, may be regarded as having a leading edge which is exactly coincident with the leading edge of the vertical sync pulse interval illustrated in Figure 1 in connection with the odd and even frame scansions. These pulses will be referred to as the "field" pulses and are applied to respective control grids 150 and 152 of Field Coincidence Detector tube 154. Cathode resistor 156 in conjunction with the variable bleeder resistor 158, which is in turn connected with a source of positive potential 160, so biases the Field Coincidence Detector tube 154 that no output pulse is developed across the load resistor 162 except under the conditions of coincidence of the local 60 cycle field pulse 140 with the remote 60 cycle field pulse 146. Upon timed coincidence of the local and remote field pulses, vacuum tube 154 is rendered conductive to produce a field coincidence pulse 164 across local resistor 162.

Correspondingly, the 15,750 C. P. S. pulses developed by multivibrators 138 and 148, each being synchronized by horizontal sync amplifier information will have a leading edge coincident with the horizontal synchronizing pulses and appropriate equalizing pulses and will consequently be termed "line" pulses. The local television signal line pulses 142 and the remote television line pulses 164 are then applied to the control grids 166 and 168 of the Line Coincidence Detector tube 172. Cathode resistor 174 in conjunction with variable bleeder resistor 176 which is in turn connected with a source of positive potential 178, sufficiently biases the vacuum tube 172 beyond cut-off that no output pulse across the load resistor 180 is developed except under conditions of coincidence between the pulses 142 and 164. Should the horizontal sync of the local and remote television signals coincide, the line pulses 142 and 164 will also coincide and produce a line coincidence pulse 182 in the output of the Line Coincidence Detector tube 172.

The field coincidence pulse 164 and the line coincidence pulse 182 are then inverted by amplifiers 184 and 186 for application in a positively extending direction to the control grids 188 and 190 of Interlaced Detector tube 192. Again, the Interlaced Detector tube 192, by means of cathode resistor 194 and bleeder resistor 196, connected with a source of positive potential 198 biases the vacuum tube 192 sufficiently beyond cut-off to prevent conduction of the tube except upon coincidence of the field coincidence pulses 164 and the line coincidence pulses 182. As will be seen hereinafter if interlaced conditions obtain between the local television signal and the remote television signal, the field coincidence pulse 164 will coincide with the line coincidence pulses 182 and provide an output pulse 200 across load impedance 202 which pulse will represent a condition of interlaced coincidence between the two signals. Therefore, the interlace coincidence pulses 200 may then be applied to a high speed detector circuit 204 which upon the production of interlace coincidence pulses 200 will develop an output voltage for amplification by D. C. amplifier 206 to effect closing of the relay winding 210. The relay contacts 212 will then close and apply horizontal synchronizing signal separated from the remote television signal (available at the output of the horizontal sync amplifier 134) to synchronizing terminal 214 of the master oscillator for direct control of the master oscillator by the remote signal.

Figures 5, 5A, 5B, 5C, 5D:
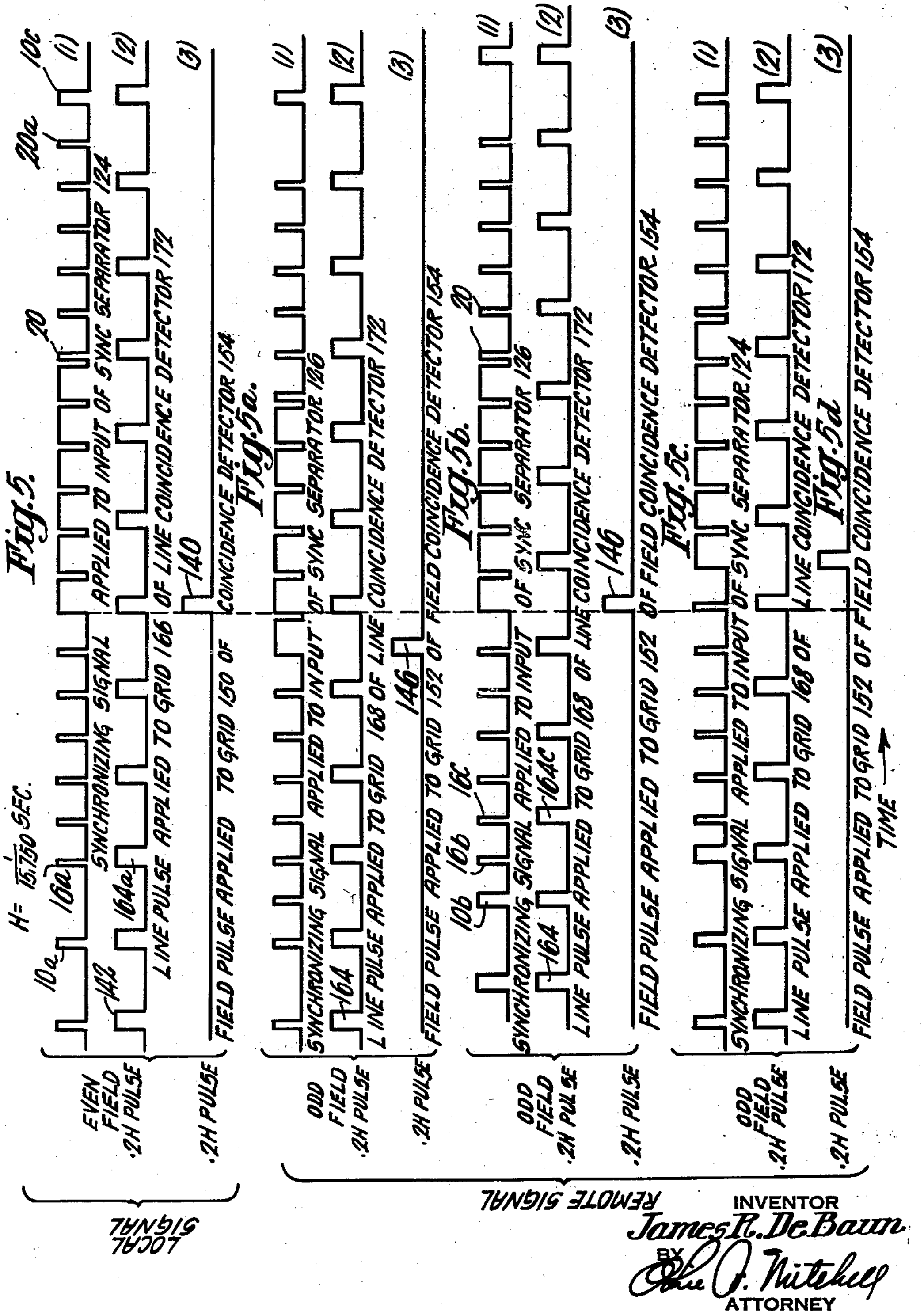
Figure 5 illustrates certain possible phase relationship between extracted remote and local synchronizing signals as applied to one aspect of the present invention.
Figures 6, 6A, 6B, 6C, 6D:
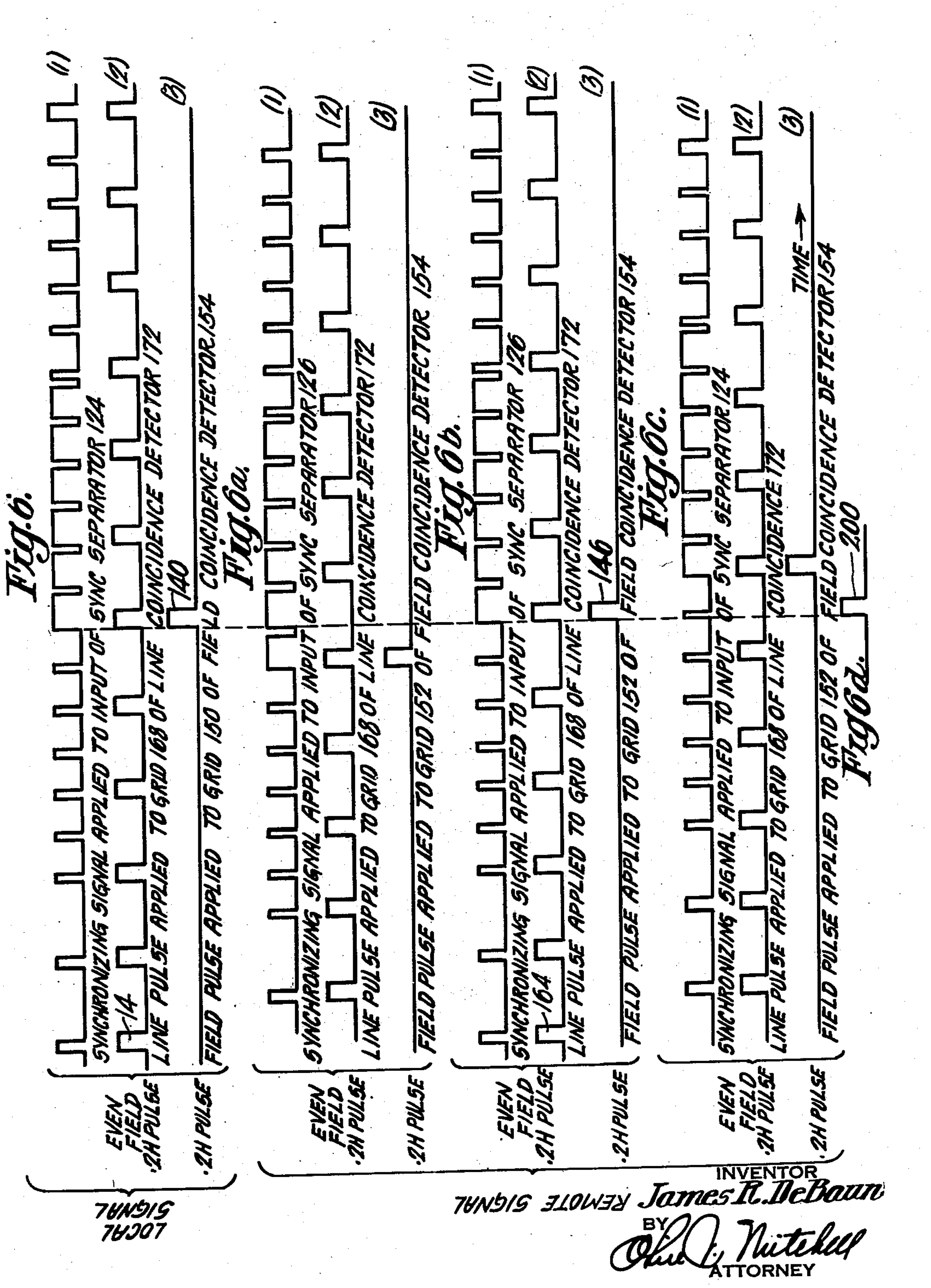
Figure 6 illustrates still another possible phase relationship between extracted remote and local synchronizing signals as applied to one aspect of the present invention.

The reason for the unique coincidence of the field coincidence pulses 164 and the line coincidence pulses 182 upon precise interlaced synchronization between the local and remote television signal may be best discerned by reference to Figures 5 and 6. By curve $5a(1)$, there is represented the separated synchronizing component of a local television signal even field configuration of the type shown by curve $1c$ of Figure 1 and applied to the input of sync separator 124. The curve $5a(2)$ represents the pulse 142 applied to grid 166 of Line Coincidence Detector 172 whereas the curve $5a(3)$ represents the local 60 cycle field pulse 140 applied to grid 150 of Field Coincidence Detector 154. These curves as well as the remaining curves in Figures 5 and 6 are all shown in timed relationship with one another as they would cooperate in accordance with the arrangement shown in Figure 4.

Figure $5c$ shows line pulse and field pulse relationships having remote odd field configuration. Curve $5c(1)$ illustrates the separated remote synchronizing signal as applied to the input of sync separator 126 while curve $5c(2)$ represents the line pulses 164 applied to grid 168 of Line Coincidence Detector 172. Curve $5c(3)$ shows the field pulse 146 applied to the grid 152 of Field Coincidence Detector 154. It is noticed that the line pulses 164 of the odd field do not bear the same timing relationship with respect to the equalizing and vertical sync pulse serrations as do the line pulses 142 of the even field with respect to their equalizing and vertical sync pulse serrations. This difference follows naturally when it is realized that in the even field configuration curve $1a$ and curve $5a(1)$ the first equalizing pulse $16a$ is separated from the leading edge of the previous sync pulse $10a$ by an interval of 1H thereby making the leading edge of the first equalizing pulse $16a$ correspond to a normal horizontal or line sync pulse and consequently in timing with the corresponding line pulse $14a$. However, in the odd configuration in curve $1b$ and curve $5c(1)$ the first equalizing pulse $16b$ is separated from the previous sync pulse $10b$ by only .5H thereby making the second equalizing pulse $16c$ correspond to the leading edge of a normal horizontal sync pulse and consequently the leading edge of the line pulses 164c.

It is this difference which, in the illustration of Figure 5, prevents the production of an interlaced coincidence pulse 200 in that, to obtain the pulse 200 both the line and field pulses of the local field must coincide with the line and field pulses of the remote signals. Obviously for the condition depicted by curves 5a and 5c, a coincidence of only three pulses is possible. Figure 5b shows the same signal and pulse conditions as 5c only displaced in phase to a time prior to the showing of 5c. Under these conditions it will again be seen that between Figures 5a and 5b, only three pulses coincide. Finally, the only remaining condition which is worthy of consideration is the relationship of Figure 5d which shows the same signal conditions as in Figure 5c only shifted in phase to a time later than the showing of Figure 5c. Again considering the even field pulse conditions of 5a with the odd field remote pulse conditions of 5d, it will be seen that only three pulses are in coincidence thereby preventing the production of an interlaced coincidence pulse 200.

Turning now to Figure 6, the curves at 6a represent the local even field synchronizing pulse conditions set forth in Fig. 5a. However, this even field configuration is now to be compared with the several possible phase displacements of a remote even field synchronizing signal configuration. Curve 6c(1) shows a synchronizing signal applied to the input of the sync separator 126 for an even field configuration of the remote signal. Curve 6c(2) shows the corresponding line pulses 164 applied to the grid 168 of Line Coincidence Detector 172. The curve 6c(3) shows the corresponding 60 cycle field pulse 146 applied to grid 152 of Field Coincidence Detector 154. Since the leading edges of the vertical sync pulses in Figures 6a and 6c are in coincidence and since both representations are even field, there then should exist conditions for the development of an interlaced coincidence pulse 200 at the output of the interlaced detector. Examination will correspondingly show that the even line and field pulses of the local signal do coincide with the line and field pulses of the even field remote signal and consequently there will be produced a field coincidence pulse 164 at the output of Field Coincidence Detector 154 and a line coincidence pulse at the output of Line Coincidence Detector 172 and consequently an interlaced coincidence pulse 200 at the output of the interlaced detector for application to the high speed peak detector circuit 204 for purposes hereinbefore described.

In order to show that the coincidence of the four line and field pulses is unique to the single conditions depicted by Figures 6a and 6c, Figures 6b and 6d have been provided to illustrate the signal of Figure 6c when displaced in time for the showing of 6c. Figure 6b shows the remote even field at a time ahead of the showing of 6c with the result that when compared with Figure 6a only two out of the required four pulses coincide, namely, the line and field pulse of the local signal. Necessarily, under such conditions neither a field coincidence pulse 164 nor a line coincidence pulse 182 will be produced. Finally, the remaining condition worthy of consideration is that of Figure 6d which shows the even field of 6c displaced in phase to a time subsequent to the showing of Figure 6c. Again, when this signal condition is compared with the pulses produced by the local even field in Figure 6a, it is seen that only two out of the required four pulses are present with the consequent absence of a coincidence pulse 200.

It is therefore seen that the Interlaced Coincidence Detector 192 will provide an output pulse only upon the conditions desirable for lock-in between the local and remote signal and that it is at this instant that the relay 210 is actuated to provide the required lock-in by application of remote television sync signal to the local master oscillator. Thus, the lock-in arrangement is wholly automatic in its action and requires no manual adjustments whatever. It may be noted that the use of both the Field Matching Detector 101 and the Interlaced Coincidence Detector system just described is important since neither by themselves is normally sufficient to produce a reliable lock-in but must be used in supplementation to one another to obtain a desirable degree of reliability.

The possible insufficiency of the Field Matching Detector 101 has been discussed and has been found to allow a certain degree of hunting between the local and remote signal. The Interlaced Coincidence Detector described in connection with Figures 5 and 6 also has one important weakness in that it is possible for the drift of the remote even field representations indicated by Figures 6b, 6c, and 6d to be so fast to prevent instantaneous coincidence of the four pulses, and hence result in failure to produce an interlace coincidence pulse 200. This follows from the fact that with regard to the 60 cycle pulses on grids 150 and 152 of the Field Coincidence Detector of Figure 4 (these pulses having a width of .2H or approximately 12 micro seconds), a drift or beat greater than $\frac{1}{10}$ of a cycle per cycle per second may cause the remote 60 cycle field pulse 146 to occur beyond the limits of Figures 6b and 6c. For beats greater than $\frac{1}{10}$ of a cycle per second, obtaining coincidence between the two 60 cycle pulses 140 and 146 resolves itself into a purely random proposition and hence the use of step 1 of the system or the Field Matching Detector arrangement is necessary to reduce the frequency or hunt to negligible value.

It is well to observe that under certain conditions, the Line Coincidence Detector 172 of Figure 4 may be eliminated as well as the Interlaced Detector 192. Under such conditions, the field coincidence pulse 164 may be directly applied to the high speed peak detector 204 to close through the synchronizing information from the remote television signal to the local master oscillator by means of relay 210. Study of Figures 5 and 6 will show that the field pulse 140 of the field local signal even frame coincides with the field pulse 146 of the remote odd field upon alignment of the leading edge of the local and remote vertical synchronizing signals. Hence, a field coincidence pulse 164 would be produced and caused to be applied to the master oscillator horizontal synchronizing information from the remote television signal. This phase relationship would be undesirable since an even and odd field lock-in is indicated under these conditions. However, upon the application of the remote sync to the local master oscillator, the local signal in Figure 6a will jump half a line due to the displacement of the horizontal synchronizing pulses as seen by curves 5a(2) and 5c(2) with the result that the field coincidence pulse, which is only $\frac{2}{10}$ of a horizontal line wide, will no longer be produced. Hence, the relay 210 will no longer apply sinc to the master oscillator and the local and remote signals will drift until the conditions obtain a complete interlace coincidence between the signals as set forth by the Figures 6a and 6c. Upon this coincidence, the field coincidence pulse 164 will again cause the application of remote sync to the master oscillator, this time with the result that a continued phase coincidence or lock-in maintains since the leading edges of the local and remote line sync pulses (as defined by the leading edges of the pulses 140 and 164 in Figures 6a and 6c) are in coincidence. With this latter arrangement of using only a field coincidence pulse for closing through or applying sync to the master oscillator, it will be necessary for the Field Matching Detector system 101 to be in control of the master oscillator through the reactance tube 78 in order to reduce the drift between the two signals to a sufficiently low value. It is apparent that this latter coincidence detector arrangement utilizing only the field coincidence pulses may not be as quick-acting and positive in operation as the overall system shown in Figure 4 which utilizes a line coincidence pulse in combination with the field coincidence pulse.

The exact manner in which control of the master oscillator 74 by remote television signal synchronizing information upon coincidence of the local and remote signal is a matter of choice and design, the method of applying horizontal sync directly to the master oscillator through the relay contacts 212 being merely exemplary. Furthermore, it may be desirable to substitute the electromechanical relay 210 by a faster acting electronic relay, such a relay being well known in the art. It will also be appreciated by those skilled in the art that many specific circuit arrangements may be used satisfactorily for functions set forth by the block representations hereinbefore described. For specific circuit arrangements suitable for application in the block representations shown, reference may be made to a publication entitled "Television Engineering" by Donald G. Fink, 1st edition issued July 1947 and to another publication entitled "Television" by V. K. Zworykin and G. A. Morton, 1940. For a more ready reference to certain particular arrangements which have been found satisfactory in the practice of the present invention, reference is made to Figure 7.

Figure 7:
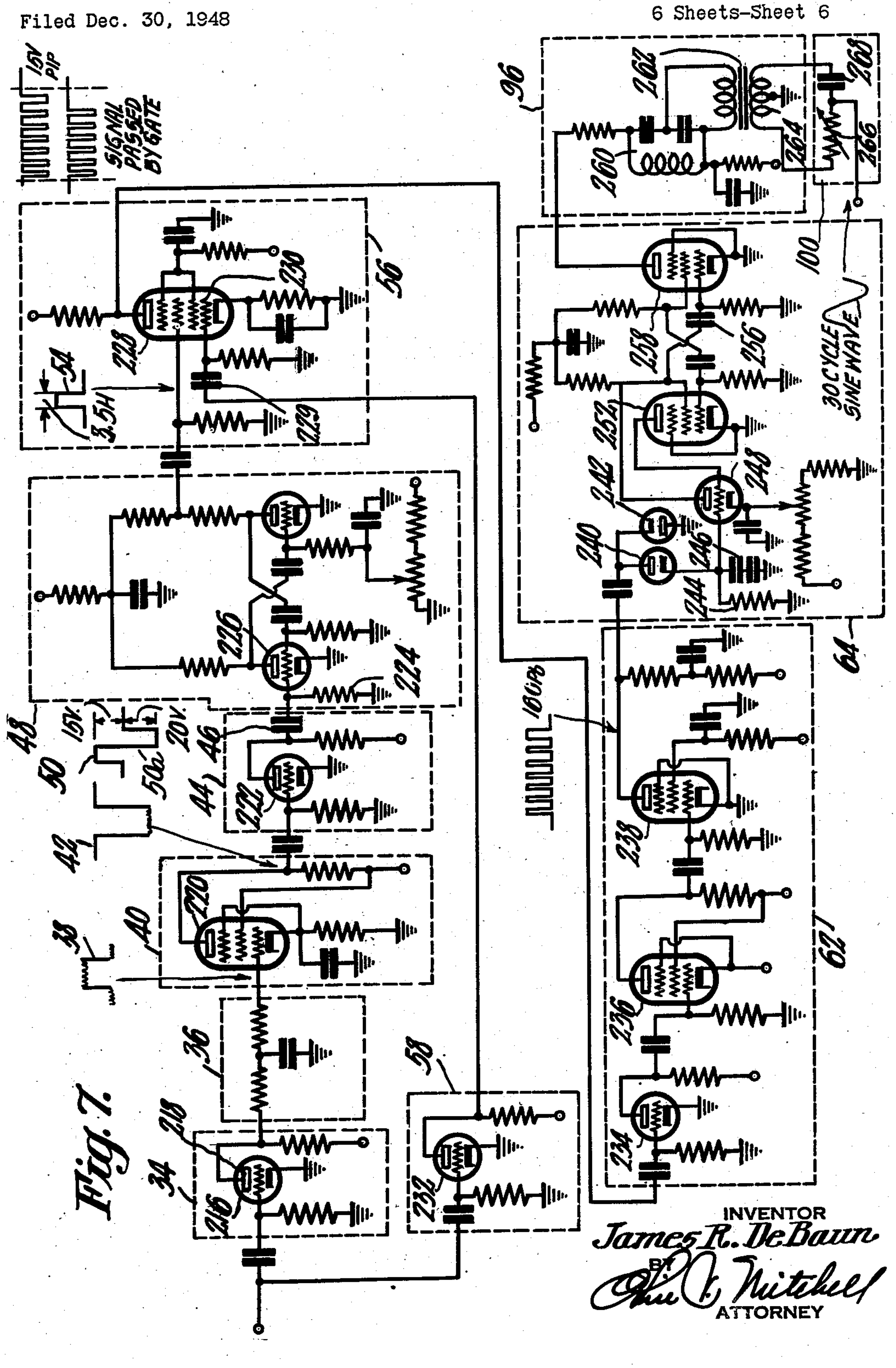
Figure 7 is a schematic representation of possible circuits suitable for application in certain portions of Figures 2 and 3.

The schematic representations of Figure 7 are clearly indicated by dotted line areas as being related to the arrangements shown in Figures 2 and 3. For instance, the field differentiator circuit of Figure 2 is supplied with a series of synchronizing signals 32 to the input of inverter amplifier 34. In Figure 7, inverter amplifier 34 is shown to comprise vacuum tube 216 having its anode 218 connected with the integrating circuit 36 of Figure 2. Continuing to follow the arrangement in Figure 2, the limiter and inverter stage 40 comprises the vacuum tube 220 operated under suitable bias conditions for limiting action. The inverter amplifier 44 comprises vacuum tube 222 connected as a conventional amplifier. The output of the inverter amplifier 44 is capacitively coupled through the capacitor 46 to the multi-vibrator circuit 48. The grid circuit resistance 224 of the first multi-vibrator vacuum tube 226 operates in conjunction with capacitor 46 to form the differentiating circuit action described in connection with Figure 2. The time constant of the multi-vibrator circuit, which will be recognized by anyone skilled in the art as being of a conventional nature, is so chosen to supply to the gated amplifier circuit 56 a series of gating pulses 54 having a width equal to 3.5H. By means of coupling capacitor 229, the gated amplifier 228 being allowed to conduct during the pulse 54 has applied to its control grid 230 the clipped synchronizing signals amplified and inverted by the inverter amplifier 58. The inverter amplifier 58 comprises a conventional vacuum tube 232 adapted for operation as a resistance coupled amplifier. The output of the gated amplifier tube 228 is then applied to a 3-stage amplifier 62 comprising vacuum tubes 234, 236, and 238, all being coupled by RC networks. The series of six or seven pulses are then applied to the seven-step counter 64 comprising the peak detector diodes 240 and 242, time constant circuit comprising resistors 244 and capacitors 246, and multi-vibrators vacuum tubes 252 and 258 with its trigger tube 248. The output of the seven-step counter 64 then comprises a series of 30 cycle pulses as described in connection with Figure 2. The second multi-vibrator tube 258 has connected in its plate circuit the tuned circuit 260 which has a resonant frequency at approximately 30 C. P. S. This permits the connection of the output transformers primary 262 across a portion of the tuned circuit to provide a 30 cycle output signal of substantially sine wave form across the secondary 264 which has its center tap grounded. The tuned circuit 260 and transformer 262 comprise the 30 cycle ringing circuit indicated by block 96 of Figure 3. The variable resistance 266 and the capacitor 268 comprises the phase shifting network 100 of Figure 3. The phase-shifted 30 cycle sine wave is then extracted from the junction of the resistance 266 with the capacitor 268, for application to the phase comparator detector 104 of Figure 3.

From the foregoing, it will be seen that the applicant has provided a new and improved system for the synchronization of a local television signal generating system by a remote composite television signal. The system is fully automatic in its phase sensing action and its subsequent lock-in between the two signals once the proper interlaced phase relationship exists between the two signals.

What is claimed is:

1. In an electrical system utilizing two unrelated electrical signals, each containing a periodically recurrent component of substantially the same waveform contour, the combination of: means for generating the periodically recurrent component of said first signal, means for timing said generator, means for segregating the periodically recurrent component from the second signal, a first and second controllable pulse generator each productive of a substantially constant width indicating pulse, means for timing said first and second controllable pulse generators respectively in accordance with said first and said second periodically recurrent signal component, means for additively combining the indicating pulses from said first and second controllable pulse generators, and controllable means for applying the second signal periodically recurrent component to said first signal periodically recurrent component generator timing means conditionally upon the timed coincidence of the indicating pulses in said combining means.

2. In a television system having a remote television source and a local television source, each television signal having a separate synchronizing component, the combination of: means for receiving the composite remote television signal, means for segregating the synchronizing component from the received remote television signal, controllable means for establishing the timing of the local television signal synchronizing component, a source of timing reference energy for said controllable means, an electronic comparator circuit, means for applying local television synchronizing information and segregated remote television synchronizing information concomitantly to said electronic comparator circuit, said comparator circuit being adapted to develop an output control potential in accordance with the compared relative timing between the local television signal component and the remote television signal synchronizing component, and means for selectively controlling said controllable means by either energy from said reference timing energy source or the comparatively developed output control potential.

3. In a television system including a remote television source and a local television source, the combination of: means connected with the local television source for generating the synchronizing signal components of the local television signal, means responsive to the local television signal for producing a first series of control pulses synchronously related to predetermined aspects of the local television synchronizing components, means for receiving composite signal from the remote television source, the remote composite signal including a synchronizing component, means coupled with the output of said receiving means for segregating the synchronizing component from the received remote composite television signal, means coupled with said last-named means for converting the segregated synchronizing signals into a second series of control pulses synchronously related to the segregated synchronizing signal, means for developing a sine wave in synchronism with one series of control pulses, a signal comparator circuit, means for applying one series of control pulses and the sine wave developed from the other series of control pulses concomitantly to said signal comparator circuit, said signal comparator circuit being adapted to develop an output control signal in accordance with the timing relationship between the sine wave and the control pulses, and means for controlling the timing of the generated local television signal synchronizing component in accordance with the output control signal developed by said comparator circuit.

4. In a television system including a remote television signal source and a local television signal source, the combination of: means connected with the local television signal source for generating the synchronizing signal components of the local television signal, means responsive to the local television signal for producing a first series of control pulses synchronously related to predetermined aspects of the local television signal synchronizing components, means for receiving composite signals from the remote television source, the composite television signal including a synchronizing component, means coupled with the output of said receiving means for segregating the synchronizing component from the received remote composite signal, means coupled with said last-named means for converting the segregated synchronizing signals into a second series of control pulses synchronously related to the remote synchronizing signals, a signal timing comparator circuit, means for applying the first series of control pulses and the second series of control pulses concomitantly to said signal comparator circuits, said signal comparator circuits being adapted to develop an output control signal in accordance with the degree of coincidence manifest between the first and second series of control pulses, means connected with said local television synchronizing signal generating means for controlling the timing of the generated synchronizing signal components of the local television signal, said controlling means being responsive to an applied control signal, and connections applying the output control signal developed by said signal comparator circuit to said controlling means.

5. In a television system including a remote television signal source and a local television signal source, the combination of: means connected with the local television signal source for generating the synchronizing signal components of the local television signal, means responsive to the local television signal for producing a first series of control pulses synchronously related to predetermined aspects of the local television signal synchronizing components, means for receiving composite signal from the remote television source, the remote composite television signal including a synchronizing component, means coupled with the output of said receiving means for segregating the synchronizing component from the received remote composite signal, means coupled with said last-named means for converting the segregated synchronizing signals into a second series of control pulses synchronously related to the remote synchronizing signals, a signal timing comparator circuit, means for applying the first series of control pulses and the second series of control pulses concomitantly to said signal comparator circuit, said signal comparator circuit being adapted to develop an output control signal in accordance with the degree of timing coincidence manifest between the first and second series of control pulses, means connected with said local television synchronizing signal generating means for controlling the timing of the generated synchronizing signal components of the local television signal, said controlling means being responsive to an applied control signal, controllable means for conditionally applying the segregated remote synchronizing signals to said local synchronizing signal generator timing control means, and means for controlling said last-named means in accordance with the output control signal developed by said signal comparator circuit.

6. In a television system including a remote television signal source and a local television signal source, the combination of: means connected with the local television signal source for generating the synchronizing signal components of the local television signal, means responsive to the local television signal for producing a first series of control pulses synchronously related to predetermined aspects of the local television signal synchronizing components, means for receiving composite signals from the remote television source, the remote composite televisional signal including a synchronizing component, means coupled with the output of said receiving means for segregating the synchronizing component from the received remote composite signal, means coupled with said last named means for converting the segregated synchronizing signals into a second series of control pulses synchronously related to the remote synchronizing signals, a first and second signal timing comparator circuit, means for applying the first series of control pulses and the second series of control pulses concomitantly to said first and second signal comparator circuits, said signal comparator circuits being each adapted to develop an output control signal in accordance with the degree of coincidence manifest between the first and second series of control pulses, a first and second controlling means connected with said local television synchronizing signal generating means for controlling the timing of the generated synchronizing signal components of the local television signal, each of said controlling means being responsive to an applied control signal, connections applying the output control signal developed by said first signal comparator circuit to said first timing control means, controllable means for conditionally applying the segregated remote synchronizing signals to said second timing control means, and means for controlling said last-named means in accordance with the output control signal developed by said second signal comparator circuit.

7. Apparatus according to claim 6 wherein said first and second series of control pulses are respectively timed in accordance with successive field scansion representations of the local and remote television signals.

8. Apparatus according to claim 6 wherein the local and remote television signals are of the interlaced variety each including alternate even and odd interlaced field scansion representations, the even field scansion representations being identified by a first configuration of related synchronizing signals embraced by an adjacent field blanking interval while the odd field scansion representations are identified by a second configuration of related synchronizing signals embraced by the next consecutive field blanking interval and wherein there is additionally provided means for generating a first and second series of indicating signals, said indicating signals being timed respectively in accordance with the local field synchronizing signal components and the remote field synchronizing signal component, means for additively combining the first and second series of indicating signals to derive an actuating impulse only upon timed coincidence of at least one aspect of the two series of indicating signals, said actuating impulse then representing timed coincidence of remote even field scansion signal representations with local even field scansion representations, means for conditionally applying segregated remote television signal synchronizing information to said local synchronizing signal component generating means for synchronization thereof, and means for controlling said last-named means in accordance with the actuating impulse produced by said means for additively combining the first and second series of indicating signals.

9. In a television system including a remote television signal source and a local television signal source, the combination of: means connected with the local television signal source for generating the synchronizing signal components of the local television signal, means responsive to the local television signal for producing a first series of control pulses synchronously related to predetermined aspects of the local television signal synchronizing components, means for receiving composite signals from the remote television source, the composite television signal including synchronizing components, means coupled with the output of said receiving means for segregating the synchronizing component from the received remote composite television signal, means coupled with said last-named means for converting the segregated synchronizing signals into a second series of control pulses synchronously related to the remote synchronizing signals, a signal comparator circuit, means for applying the first series of control pulses and said second series of control pulses concomitantly to said signal comparator device, said signal comparative device being adapted to develop an output control signal in accordance with the degree of coincidence manifest between the first and second series of control pulses, control means connected with said local television synchronizing signal generating means for controlling the timing of the generated synchronizing signal component of the local television signal, said controlling means being responsive to an applied control signal, a source of reference timing control signal, and means selectively applying said reference timing control signal or said comparator circuit output control signal to said control means.

10. In a television system including a remote television signal source and a local television signal source, the combination of: means connected with the local television signal source for generating the synchronizing signal components of the local television signal, means responsive to the local television signal for producing a first series of control pulses synchronously related to predetermined aspects of the local television signal synchronizing components, means for receiving a composite television signal from the remote television source, the composite signal including a synchronizing component, means coupled with the output of said receiving means for segregating the synchronizing component from the received remote composite television signal, means coupled with said last-named means for converting the segregated synchronizing signals into a second series of control pulses synchronously related to the remote synchronizing signals, a signal comparator circuit, means for applying the first set of control pulses and the second set of control pulses concomitantly to said signal comparator circuit, said signal comparator circuit being adapted to develop an output control signal in accordance with the degree of coincidence manifest between the first and second set of control pulses, a first timing control means connected with said local television synchronizing signal generating means for controlling the timing of the generated synchronizing signal components of the local television signal, said first controlling means being responsive to an applied control signal, a source of timing reference signal for said first timing control means, a second timing control means for timing said local television synchronizing signal generating means by direct application of segregated remote synchronizing signal, and means for selectively controlling said local television synchronizing signal generating means by either application of said source of reference timing signal to said first timing control means or the concomitant application of said comparative circuit output control signal to said first timing control means and application of the segregated remote synchronizing signal to said second timing control means.

11. In an interlaced television system utilizing a composite television signal comprising alternate even and odd interlaced field scansion representations, the even field scansion signal representations being identified by a first configuration of related synchronizing signals, while the odd field scansion signal representations are identified by a second and different configuration of related synchronizing signals, the combination of: means for separating the synchronizing signals from the composite television signal, means for generating a recurrent control pulse in synchronism with the separated synchronizing signals, the control pulses being timed to occur only during those portions of the television signal corresponding to the first and second synchronizing signal configurations, a gated amplifier adapted to conditionally communicate the separated synchronizing signals, means for applying said control pulse to said amplifier to permit communication of synchronizing signals only during periods corresponding in timing and duration to the control pulses, means for detecting the amount of energy communicated by said gated amplifier during successive periods corresponding to said control pulses, and means connected with said last-named means for comparing the amount of energy detected by said detecting means during communication of even and odd field scansion synchronizing signals by said gated amplifier.

12. In a television system having remote composite television signal source and a local composite television signal source, each of the television signals associated with said sources being of the interlaced variety including alternate even and odd interlaced field scansion representations, the even field scansion signal representations being identified by a first configuration of related synchronizing signals embraced by an adjacent field blanking interval while the odd field scansion representations are identified by a second and different configuration of related synchronizing signals embraced by the next consecutive field blanking interval, each of the synchronizing signal configurations including a line component and a field component, the combination of: means for generating the line and field synchronizing components of the local television signal, means for receiving the composite remote television signal, means for segregating the line and field synchronizing components from the received remote television signal, a first, second, third and fourth signal generators, separate timing means associated with each signal generator, means for respectively applying local line synchronizing component, local field synchronizing component, remote line synchronizing component, remote field synchronizing component to the timing means respectively associated with said first, second, third and fourth signal generator for respective timing control thereof, and means for combining the outputs of said signal generators to obtain an actuating impulse representing the concurrent superimposition of the four signals, the occurrence of said actuating signal thereby representing timed coincidence of remote even field scansions with local even field scansions.

13. In a television system having remote composite television signal source and a local composite television signal source, each of the television signals associated with said source being of the interlaced variety including alternating even and odd interlaced field scansion representations, the even field scansion signal representation being identified by a first configuration of related synchronizing signals embraced by an adjacent field blanking interval while the odd field scansion representations are identified by a second configuration of related synchronizing signals embraced by the next consecutive field blanking interval, each of the synchronizing signal configurations including a line component and a field component, the combination of: means for generating the line and field synchronizing components of the local television signal, means for receiving the composite remote television signal, means for segregating the line and field synchronizing components from the received remote television signal, a first and second signal generators, separate timing means respectively associated with each signal generator, means for respectively applying local field synchronizing component and remote field synchronizing component to the timing means respectively associated with said first and second signal generator, and means for combining the outputs of said signal generators to obtain an actuating impulse representing the concurrent superimposition of the two signals, the occurrence of said actuating signal thereby representing timed coincidence of remote field scansions with local field scansions.

JAMES R. DE BAUN.

REFERENCES CITED

The following references are of record in the file of this patent:

UNITED STATES PATENTS

| Number | Name | Date |
|---|---|---|
| 2,138,398 | Cooley | Nov. 29, 1938 |
| 2,227,000 | Bingley | Feb. 17, 1942 |
| 2,275,249 | Cooley | Mar. 3, 1942 |
| 2,329,339 | De Baun | Sept. 14, 1943 |
| 2,350,536 | Schlesinger | June 6, 1944 |
| 2,428,946 | Somers | Oct. 14, 1947 |